United States Patent
Risi (10) Patent No.: US 9,297,715 B2
(45) Date of Patent: Mar. 29, 2016

(54) PERFORMANCE AND/OR STRESS-INDICATING DEVICE

(75) Inventor: Mirco Risi, San Giovanni in Persiceto (IT)

(73) Assignee: SIMEX, S.R.L., San Giovanni in Perseceto (IT)

( * ) Notice: Subject to any disclaimer, the term of this patent is extended or adjusted under 35 U.S.C. 154(b) by 274 days.

(21) Appl. No.: 14/129,689

(22) PCT Filed: Jun. 28, 2012

(86) PCT No.: PCT/IB2012/001758
§ 371 (c)(1),
(2), (4) Date: Mar. 6, 2014

(87) PCT Pub. No.: WO2013/005112
PCT Pub. Date: Jan. 10, 2013

(65) Prior Publication Data
US 2014/0209010 A1    Jul. 31, 2014

(30) Foreign Application Priority Data
Jul. 1, 2011    (IT) .............................. BO2011A0388

(51) Int. Cl.
*G01L 19/10* (2006.01)
*G01L 5/00* (2006.01)
*E01C 23/088* (2006.01)

(52) U.S. Cl.
CPC .............. *G01L 19/10* (2013.01); *E01C 23/088* (2013.01); *G01L 5/0071* (2013.01); *E01C 2301/30* (2013.01)

(58) Field of Classification Search
CPC .............. E01C 23/088; E01C 2301/00; E01C 2301/30; E02F 9/26; F15B 15/20; F15B 15/28; G01L 5/00; G01L 5/0061; G01L 5/0066; G01L 5/0071; G01L 7/16; G01L 7/163; G01L 7/166; G01L 19/08; G01L 19/10
USPC ........... 116/212, 266, 272, 281, 283; 73/1.57, 73/1.59, 1.63, 1.64, 1.66, 1.68, 744
See application file for complete search history.

(56) References Cited

U.S. PATENT DOCUMENTS

| 1,641,838 A | 9/1927 | Burkhardt |
| 2,742,162 A | 4/1956 | Mandt |
| 2,847,918 A | 8/1958 | Harrison |

(Continued)

FOREIGN PATENT DOCUMENTS

| GB | 483099 A | * | 4/1938 | ................ G01L 7/16 |
| GB | 689539 A | * | 4/1953 | ................ G01L 7/16 |

(Continued)

*Primary Examiner* — R. A. Smith
(74) *Attorney, Agent, or Firm* — Fattibene and Fattibene LLC; Paul A. Fattibene (57) ABSTRACT

Performance indicating device (400) adapted to be connected to a processing apparatus (100), in particular to an apparatus for demolishing and in particular for milling surfaces or layers (Sr) upon which one can walk or drive such as for example surfaces made of asphalt or cement or of similar solid materials, and/or to a main operating machine (300) actuating said apparatus (100), said apparatus (100) comprising processing means (10), said device comprising at least a first movable indicating element (401) adapted to be alternatively moved in a first sense of motion and in the opposite sense in case of increase and decrease of the stress undergone by said processing means (10), respectively.

17 Claims, 9 Drawing Sheets

(56) References Cited

U.S. PATENT DOCUMENTS 4,198,921 A    4/1980  Horton ........................ 116/283
6,604,486 B1 * 8/2003  Krisko ............... B01D 46/0086
                                                      116/268

FOREIGN PATENT DOCUMENTS

| GB | 1385657 A * | 2/1975 | ................ G01L 7/16 |
| RU | 777521 | 11/1980 | |
| SU | 1112244 A1 * | 9/1984 | ................ G01L 7/16 |

* cited by examiner

PERFORMANCE AND/OR STRESS-INDICATING DEVICE

TECHNICAL FIELD OF THE PRESENT INVENTION

The present invention relates to the management of the performance of a processing apparatus or machine. In particular, the present invention is relative to a device adapted to indicate the stress which an apparatus for processing solid surfaces such as roads, footpaths and/or similar surfaces, can undergo, in such a way as to enable an operator to fully exploit the capabilities and/or possibilities of the apparatus itself.

In detail, the present invention is relative to a device of the mentioned type and, thus, adapted to indicate the stress which can be undergone by an apparatus for demolishing and/or milling solid surfaces such as, for example, roads, footpaths and/or general surfaces made of solid materials such as, for example, asphalt or cement. In even more detail, the present invention is applied in a particularly advantageous manner to an apparatus of the type previously described, adapted to be actuated by a main operating machine comprising hydraulic means (for example, pumps and/or hydraulic engines) adapted to actuate said apparatus.

DESCRIPTION OF THE STATE OF THE ART

In the state of art, apparatuses for processing and in particular for demolishing and/or milling roads, footpaths and/or solid surfaces in general are known.

Figure 1:
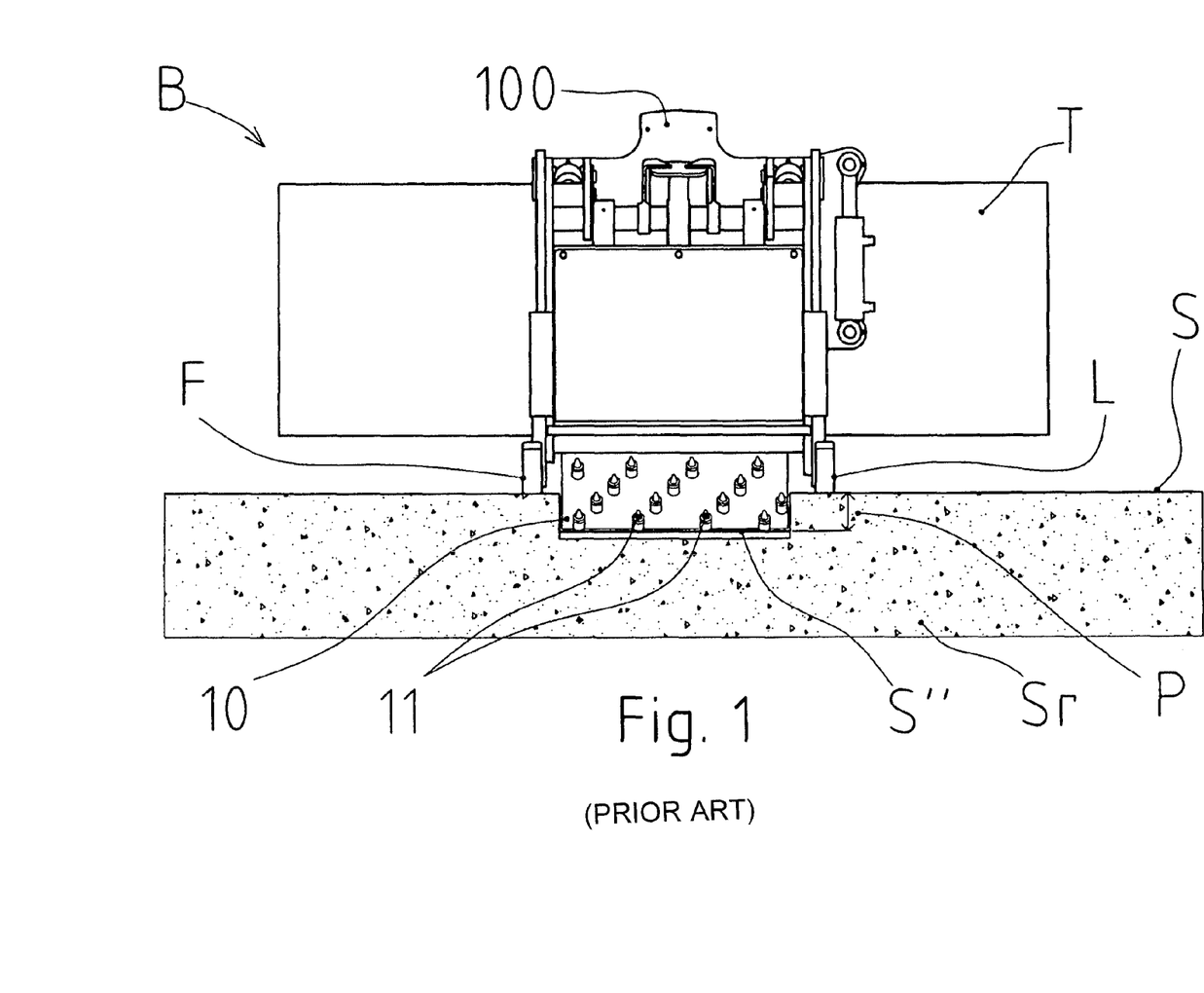
FIGS. 1 and 2 show front and perspective views of an apparatus (milling machine for milling solid surfaces) of the type known in the state of the art, respectively.
Figure 2:
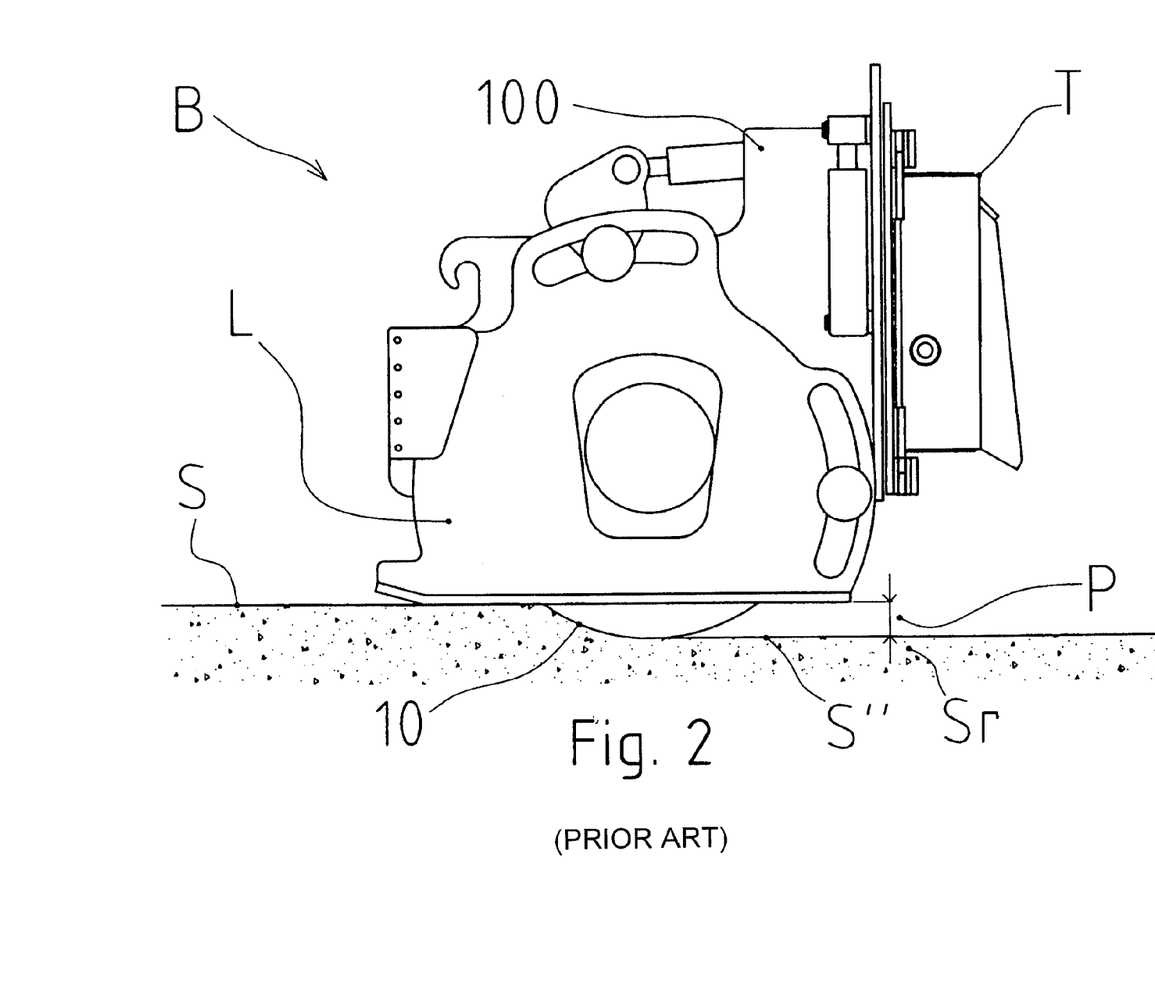

An example of an apparatus of this type known in the state of the art is shown in FIGS. 1 and 2. As apparent, for example, from FIGS. 1 and 2, the apparatuses of known type (identified in FIGS. 1 and 2 by the reference letter B) comprise a main frame T onto which a processing and/or demolishing or milling roller 10 is rotatably fixed. The roller 10 is provided with processing tools 11 which protrude from the outer surface of said roller 10. The roller 10 is usually hydraulically actuated, i.e. by means of hydraulic engines and/or hydraulic pumps (not shown in the Figures) and/or similar hydraulic devices. Furthermore, the apparatus is usually applied to a main operating machine (also not shown in FIGS. 1 and 2) comprising a main hydraulic system. The main hydraulic system in turn comprises the hydraulic means (pumps and/or engines) which actuate (for example, cause the roller 10 to rotate and/or lift or lower the roller 10) the apparatus B.

The position of the processing means (roller) 10 with respect to the main frame T may be varied depending on the needs and/or circumstances so as to define the processing depth p and thus, the thickness of the layer Sr to be milled or ground or removed and/or crushed. This means, in particular, that the position of the roller 10 with respect to the main frame T may be chosen and defined according to the needs and/or circumstances. For example, in case of particularly tough surfaces Sr, the processing depth p of a single milling operation or pass (i.e. the distance between the original surface S and the surface S" defined by the processing means (roller) 10) may be reduced (in this case, the overall and final processing depth obtained by means of the roller 10 may be achieved by means of repeated and subsequent passes). Conversely, in the event of not particularly tough or resistant layers or surfaces Sr, the processing depth p of a single milling operation or pass may be increased (so that in this case, the overall and final processing depth obtained by means of the processing means (roller) 10 may be achieved by means of one single pass or a few subsequent passes).

In an analogous manner it is possible to adjust, depending on the needs and/or circumstances, the advancement speed of the processing means 10 (for example, by adjusting the advancement speed of the main machine), as well as the velocity of rotation about its own rotation axis. Again, as an example, a reduced advancement speed may be preferred when a high processing depth is chosen, whereas a high advancement speed can be set in the case of a reduced processing depth.

It can be understood from the above that the instantaneous stress undergone by the processing means (roller, in the case of the apparatus of FIGS. 1 and 2) 10 depends on its instantaneous advancement speed, velocity of rotation and processing depth. In other words, the instantaneous performance (work carried out per time unit instantaneously measured) will result from the three components, namely, instantaneous advancement and rotation speed and processing depth.

Analogously, it should be made clear that by the expression "maximum performance" which may be provided by the machine (in particular, by the roller), one means here the performance corresponding to the maximum stress which the machine and/or the roller may bear. In turn, the maximum stress corresponds to the stress which the various constituent parts may bear, without risking that the same parts are damaged or blocked or pulled out of order. In even more detail, in the case of an apparatus whose constituent parts are hydraulically actuated, an increase of the stress results in an increase of the hydraulic pressure within the hydraulic circuit. Thus, the maximum stress corresponds to the maximum pressure which can be reached within the hydraulic circuit or hydraulic system. Finally, it should be pointed out that in the apparatus for milling solid surfaces of known type, the hydraulic system is provided with a safety device (comprising, for instance, a safety valve) which stops or blocks the roller (and, if necessary, halts the entire main machine by preventing it from advancing), when the pressure within the hydraulic circuit reaches a maximum threshold pressure set by the producer.

Apparatuses of known type, however, have the remarkable disadvantage that it is not practicably possible for the operator (who is to manage the processing apparatus by means of the main machine) to appreciate the instantaneous stress undergone by the roller. In particular, it is difficult for the operator to precisely appreciate whether the instantaneous performance being provided is close to the maximum performance or not, and thus, whether it would be possible or not to have the machine undergo even greater stress by increasing the velocity (advancement and rotation velocity) and/or the processing depth and/or one or more of these components without incurring a block of the roller and/or of the entire main machine. For this purpose, commercial pressure gauges are known in the state of the art and could be used by the operator. However, in this case, the operator should know a priori the setting and the calibration of the operating machine which he is using. Furthermore, the pressure gauges of known type are provided with a glass screen which might, in particular operating conditions, cause problems related to safety. Moreover, the screen of these pressure gauges of known type is usually of reduced dimensions and thus barely "legible". Two risks are then incurred, namely that, on the one hand, the capabilities of the machine are not fully exploited and, on the other hand, that an excessive stress is required from the machine. In the first case, the amount of work carried out per time unit decreases. In the other case, repeated halts of the roller and/or of the main machine occur which cause a waste of time and carry the risk of damages or an accelerated deterioration of the roller and/or of the apparatus.

It should be further observed that the need for the operator to determine the maximum stress allowed occurs in all those cases when the operating conditions of the machine (for instance, of the milling machine) change and, furthermore, in all cases when these same operating conditions may vary often within a single pass and between two different passes (for example, passes which have to be carried out on two different stretches of a road in different places). Indeed, while carrying out one single pass, it could happen that the tenacity of the surface to be processed (milled) with a pass decreases along the same pass. However, in this case, by using milling machines according to the state of the art, the operator will not be able to perceive that the required stress has decreased (and therefore that there is a chance of increasing the advancement speed and/or the processing depth) and, thus, he will maintain the previously set velocity and depth, thereby not using the machine or apparatus to its full capacity and increasing the overall time of completion of the pass.

Analogously, in the case of two different passes to be carried out, for example, on different roads or surfaces (in different places), if the characteristics of the surface change, it will be impossible for the operator to set operating variables (advancement and/or rotation velocity) and processing depth in a simple, precise and effective manner, so as to properly take advantage of the capabilities of the machine (milling machine). Thus, in this case, it cannot be excluded that two passes are necessary which are completed within a time "x", whereas it could have been possible to complete the task by means of a single pass which would have required a shorter time.

SUMMARY AND GOALS OF THE INVENTION

It is thus a goal of the present invention to obviate the drawbacks mentioned above and found in the solutions known from the state of the art. In particular, the goals and aims of the present invention can be summarized as follows.

A goal of the present invention is to provide a solution which allows the operator to set the operating variables of the machine (while adapting them to the particular conditions of the moment) by means of simple and immediate operations, in such a way that the same machine may always be exploited up to its maximum capabilities irrespective of the operating conditions, thus avoiding waste of time or fuel etc. In particular, a further goal of the present invention is to provide a device which continuously and instantaneously signals to the operator the stress undergone by the machine or apparatus (in relation to the maximum stress allowed by the operating machine), so that the operator may continuously modify the variables of operation and/or use (in particular, the advancement velocity) of the machine, thus continuously having the machine undergo the stress level which is as close as possible to the maximum stress allowed (beyond which one or more of the constituent parts would be damaged or blocked).

In even more detail, a further goal of the present invention is to implement a device of the type previously described which can be applied by means of simple and immediate operations to machines and/or apparatuses of different types, in particular to machines and/or apparatuses of a hydraulic type (provided with hydraulic devices such as hydraulic engines and/or pumps) such as, for example, but not limited to, machines and/or apparatuses for processing, in particular for demolishing and/or milling roads, footpaths and/or solid surfaces in general. Finally, a further goal of the present invention is to implement a device of the type previously described which is robust and reliable, as well as being easily assembled and maintained and thus, characterized by low manufacturing costs.

The goals and aims previously mentioned and described will be achieved by means of a performance-indicating device adapted to be connected to a processing apparatus comprising processing means, in particular, to an apparatus (100) for demolishing and in particular for millings surfaces or layers (Sr) upon which one can walk and/or drive such as for example surfaces made of asphalt or cement or similar solid materials. Further advantages will be obtained by means of the further embodiments of the present invention.

DESCRIPTION OF THE PRESENT INVENTION

The present invention is applied in a particularly convenient manner to the field of processing surfaces or solid layers. In particular, the indicating device according to the present invention is particularly and advantageously applied to the field of machines and/or apparatuses for processing surfaces or solid layers such as roads, footpaths and/or similar surfaces. In more detail, the device according to the present invention can be advantageously applied to an apparatus of hydraulic type for demolishing and/or milling surfaces or solid layers such as, for example, roads, footpaths or surfaces in general made of solid materials such as, for instance, asphalt or cement. This is thus the reason why, in the following examples, application of the device according to the present invention will be described in the particular case of hydraulic apparatuses or machines for processing, in particular for demolishing and/or milling, surfaces or layers of the type previously described. However, it is pointed out here that the possible applications of the device according to the present invention are not limited to the particular case of hydraulic type apparatuses for demolishing and/or milling surfaces or solid layers. Conversely, the present invention can advantageously be applied to all those cases in which it may be necessary and/or useful to manage the stress undergone by a device or apparatus, in particular by indicating to an operator the maximum allowed stress in relation to the particular conditions of the moment. The operator is thus able to continuously have the apparatus or machine undergo stress which is as close as possible to the maximum allowed stress, so as to take advantage of the machine's full potential, thereby optimizing the results and minimizing the processing times. Indeed, the device according to the present invention allows one to determine the maximum stress allowed for each type of processing and depending on the particular processing conditions. Furthermore, the present invention allows the stress undergone by the machine and/or apparatus to be indicated to the operator in a continuous manner. The operator will thus be able, by simply checking (observing) the device according to the present invention, to continuously adjust the processing variables so as to continuously have the machine or apparatus undergo an optimal stress and close to the maximum stress, thus avoiding both risks of not fully exploiting the capabilities of the machine and of having it undergo an excessive stress level.

The present invention is based on the general concept that the disadvantages or drawbacks typical of the solutions known from the state of art (in particular of the apparatuses for demolishing and/or milling surfaces or layers known from the state of the art) can be overcome or at least minimized by implementing an indicating device which can be calibrated for each new use of the machine or apparatus and which comprises at least two mobile-indicating elements (e.g. translatable but also rotatable). One of these indicating elements (calibrating element) is moved during the calibration due to the increasing stress and subsequently keeps the position assumed after the maximum stress has been reached (for example, when a halt of one or more parts of the machine occurs), whereas the other indicating element is moved when the instantaneous stress varies in such a way that an operator, by observing the reciprocal position of the two indicating elements, can appreciate whether the instantaneous stress is close to the maximum stress allowed and, if necessary, can modify the processing variables (for example, by increasing the advancement velocity), in order to keep the instantaneous stress as close as possible to the maximum stress allowed. In particular, the drawbacks typical of the devices of known type can be overcome or at least minimized by means of a performance-indicating device adapted to be connected to a processing apparatus, in particular to an apparatus for demolishing and in particular for milling surfaces or layers upon which one can walk or drive such as, for example, surfaces made of asphalt or cement or of similar solid materials and/or to a main operating machine actuating said apparatus, said apparatus comprising processing means, said device comprising at least a first movable indicating element adapted to be alternatively moved in a first sense of motion and in the opposite sense in case of increase and decrease of the stress undergone by said processing means, respectively, said device comprising a second indicating element, said first indicating element being connected to said second indicating element so as to drag said second indicating element during its motion in said first sense of motion and so as to freely move with respect to said second indicating element for at least a predefined segment of its motion in the sense opposite to said first sense of motion.

Indeed, in this case, the second indicating element will be dragged by the first indicating element during the calibration of the device until it reaches a position corresponding to the maximum stress. This position will be maintained during the actual use of the machine up to a new reset or in the event of recalibration. In particular, the device according to the present invention is designed in such a way that the position corresponding to the maximum stress is reached by said second indicating element by means of the engagement with said first indicating element and without any action taken by the operator but, rather, in an automatic manner. On the other hand, the first indicating element will freely move with respect to the second indicating element in one sense or the other one depending on the increase or decrease of the stress, thus indicating to the operator how close the instantaneous stress is to the maximum stress allowed. Further advantages can be obtained by means of the embodiment of the present invention by means of a device wherein both said first and second indicating elements are movable (for example, translatable but they could also be rotatable) in said first sense of motion (translation) and in the opposite sense. In this case, the second indicating element can be manually "reset to zero" by the operator in a simple manner. In other words, the second indicating element can be brought back to its position corresponding to an absent or zero level of stress every time when the apparatus or machine needs to be recalibrated. This can for example be the case when the apparatus or machine is used in different operating conditions, and/or when the processing apparatus (for example, a milling machine or a wheeled excavating machine) is applied to different main machines (e.g. with a different hydraulic system). Further advantages can be obtained by means of a device further comprising elastic means adapted to undergo elastic strain during the motion of said first indicating element in said first sense of motion (when the stress increases) and to move said first indicating element in the direction opposite to said first sense of motion in case said stress decreases. Indeed, the elastic means will make the motion of said first indicating element in said opposite sense of motion immediate and precise in case of decrease of the stress, thus avoiding delays of motion which might confuse the operator. Additional advantages will be guaranteed by the further embodiments of the device according to the present invention.

BRIEF DESCRIPTION OF THE FIGURES

In the following, the present invention will be explained by means of the description with respect to some of its embodiments represented in the attached Figures. However, one should be aware that the present invention is not limited to the embodiments represented in the Figures; conversely all those variations or modifications of the embodiments represented and described, which will be clear, obvious and immediate to the skilled person, are within the scope and the area of the present invention. In particular, in the attached Figures.

DETAILED DESCRIPTION OF SOME EMBODIMENTS OF THE PRESENT INVENTION

Figure 3:
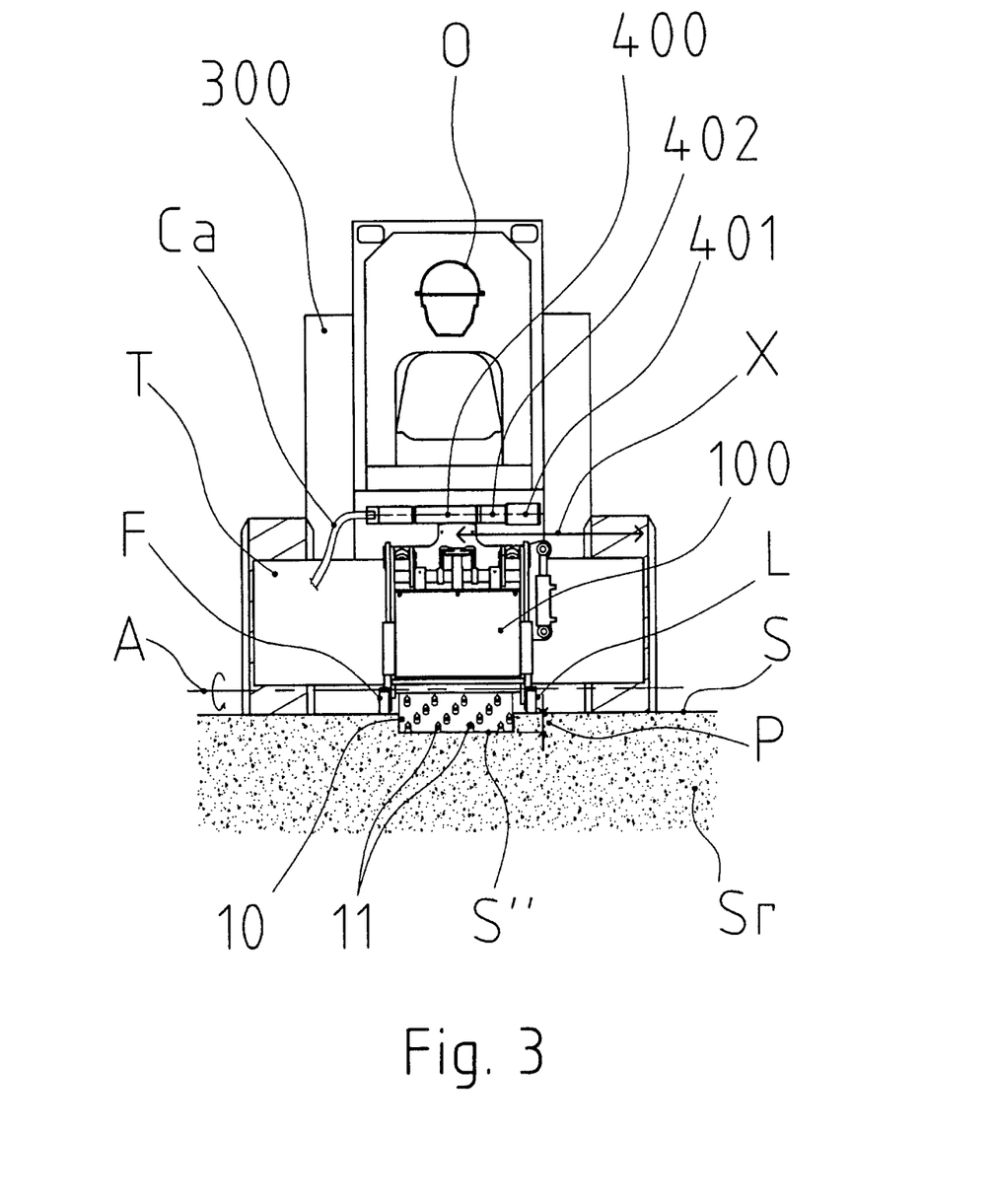
FIG. 3 shows a front view of an apparatus (milling machine for milling solid surfaces) applied to a main operating machine and provided with an indicating device according to an embodiment of the present invention.

In FIG. 3, the apparatus (milling machine) is identified by the reference number 100. As apparent from the Figure, the apparatus 100 is totally similar to an apparatus of known type (see FIGS. 1 and 2) and comprises a main frame T to which a processing and/or milling roller 10 is rotatably fixed. Milling tools 11 extend from the outer surface of the processing and/or milling roller 10. The milling roller 10 is in particular rotatable about a main rotation axis A, substantially coincident with its own symmetry axis. Furthermore, the milling tools 11 can be, depending on the needs and/or circumstances, fixed or interchangeable. The main frame T further comprises connecting and/or fixing means (not shown in the Figure), by means of which the apparatus 100 is fixed (applied) to a main operating machine 300 driven by an operator O. In particular, the main operating machine 300 can be of the type shown in FIG. 3, i.e. of the type wherein the apparatus is fixed to the front part of the main operating machine, or of the type wherein the apparatus is fixed to an articulated connecting main arm which enables actuating and moving the same apparatus and, in particular, positioning it in the desired operating position. The main frame T is further provided with two support slides F and L, fixed on two opposite sides of the main frame. In use, as shown in FIG. 3, the two opposite slides F and L are brought into contact with the upper surface S of a layer to be processed and/or milled Sr, for example with a solid layer on which one can walk or drive, for example made of asphalt, cement or similar materials. Thus, one can infer, in particular from FIG. 3, that the processing depth p will be set by adjusting the position of the slides F and L with respect to the main frame T. The other important processing parameter, i.e. the advancement velocity (in a perpendicular direction to FIG. 3) of the operating machine 300 will be chosen by the operator O, for example, by means of a maneuver joystick. The apparatus 100 further comprises an indicating device 400 according to the present invention which is installed in a position (with respect to the apparatus 100 and to the main operating machine 300) such as to allow the operator O to easily check the same device. A more detailed description of the parts making up the device 400 as well as of its functions will be given in the following. However, it can be anticipated here that same device is linked by means of a hydraulic conduit Ca to the hydraulic system (not shown in FIG. 3) of the main operating machine 300, in such a way as to "detect" and to be sensitive to the pressure variation within the hydraulic circuit of the main operating machine 300. In particular, the device 400 comprises a first end 404 (on the left-hand side of FIG. 3 and visible in FIG. 4A) adapted to be connected to the hydraulic conduit Ca, and a second end opposite to said first end, which comprises two indicating elements, in particular, a first indicator 401 and a second indicator 402. Said first and second indicator 401 and 402 are in particular mobile (for example, translatable) in the direction of the arrow X and, in particular, both in one sense and in the opposite sense, depending on whether the pressure in the hydraulic circuit of the main operating machine 300 increases or decreases. The two indicating elements 401 and 402 carry out (as will be clear from the detailed description in the following) similar although not identical functions. In particular, the indicator 401 is moved in a sense (from left to right in FIG. 3) a first time during the calibration of the device 400 thus also dragging in its motion the second indicating element 402, until same has reached the position corresponding to the maximum hydraulic pressure allowed within the hydraulic circuit of the main operating machine 300. After this first calibrating stage, the first indicator 401 will freely move with respect to the second indicator 402 which will instead be fixed in the position previously reached and taken. In particular, the first indicator 401 will alternatively move in one sense or in the other one, i.e. from left to right (in FIG. 3) when the hydraulic pressure increases as well as from right to left when the hydraulic pressure decreases. In this manner, the operator O will be able to appreciate the instantaneous stress undergone by the apparatus 100 (in particular by the roller 10) by simply checking the position of the first indicating element 401 with respect to the second indicating element 402 and, thus, to increase or decrease the stress level (for example, by increasing or decreasing the advancement velocity) so as to keep same stress level as close as possible to the maximum stress allowed. The second indicating element is also adapted to be "reset to zero", for example manually, by the operator O, who will cause it to translate for this purpose before starting with a new task or processing stage or when the apparatus 100 and/or the device 400 happen to be installed on a different main operating machine, in particular, with a different hydraulic circuit.

In the following, with reference to FIGS. 4A, 4B, 5A and 5B, further details of the indicating device according to the present invention will be described and clarified. In FIGS. 4A, 4B, 5A and 5B, those constituent parts or features of the device according to the present invention which have already been described with reference to other Figures are identified by the same reference numbers.

As shown in FIGS. 4A, 4B, 5A and 5B, the device 400 according to the embodiment represented therein, comprises a tubular shaped hollow main body 403, within which a main piston 405 is housed, said main piston 405 being translatable within the tubular shaped hollow main body 403.

A first end (on the left-hand side in the Figures) of the piston 405 is connected to the hydraulic circuit Ca by means of a hydraulic linking joint 406. In this manner, the indicating device 400 is connected to said main hydraulic system like any other device or hydraulic component such as, for example, a hydraulic pump.

The second end of the piston 405 (opposite to that connected to the hydraulic system and thus, in this case, on the right-hand side in the Figures) is rigidly connected to the first indicating element 401. In particular, for this purpose, first indicating element 401 is shaped substantially as a glass (thus substantially tubular and hollow), with a closed bottom wall 401f, to which the second end portion of the piston 405 is fixed. Said first indicating element 401 is adapted to at least partially house the second indicating element 402. In particular, also said second indicating element 402 is substantially tubular and hollow with an external diameter corresponding to or slightly less than the internal diameter of the first indicating element 401. In other words, and as will be explained in more detail in the following, the first indicating element 401 is adapted to "slide on the second indicating element 402" and to engage with said second indicating element 402 in an automatic manner and only when necessary.

The main tubular and hollow body 403 of the indicating device 400 further comprises a tapered portion 403R, from which an end portion 403E of said main body 403 extends. Also shown in the Figures is that the second indicating element 402 is adapted to at least partially house said end portion 403E of the main body 403, said end portion 403E thus having an external diameter corresponding to or slightly less than the internal diameter of the second indicating element 402. In other words, the second indicating element 402 "is able to slide on the end portion 403E of the main body 403" of the indicating device 400 in the same way as the first indicating element 401 is able to "slide on the second indicating element" 402. It results from the Figures that an abutting or contrast ring 408 is firmly fixed (in a fixed position) to the piston 405 in an intermediate position along it. Such an abutting or contrast ring 408, in particular, defines an abutting or contrast surface 409 facing the second end portion 403E of the main hollow body and having a substantially annular shape. A second contrast or abutting element 410 that has also a ring shape and thus comprising a through-hole (not visible in the Figures) adapted to allow the piston 405 to slide within it, is firmly fixed (in a predefined position) to the inner surface of the second end portion 403E of the main body 403 of the device 400 and defines a second abutting or contrast surface 411 shaped as an annulus. Finally, a helical spring 407 is housed within the hollow body 403, in particular, between the two contrast or abutting elements or rings 409 and 410 in such a way that the portion of the piston 405 included between said two contrast or abutting elements or rings 409, 410 is housed in the internal space defined by the helical spring 407.

The function of the various constituent parts of the device 400 can be summarized as follows.

Figure 4A:
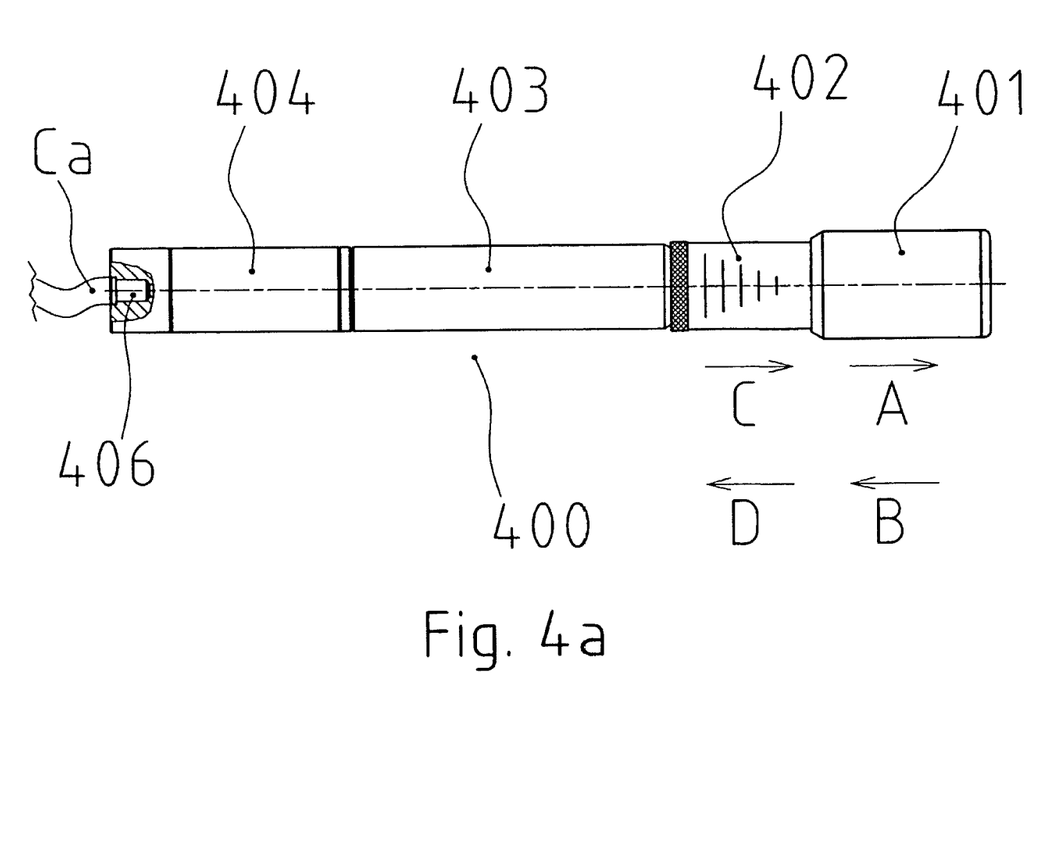
FIGS. 4A and 4B show two views of the device according to an embodiment of the present invention with the indicating elements in a pre-calibrating position and in the position taken after the calibration of the device has been completed, respectively.
Figure 4B:
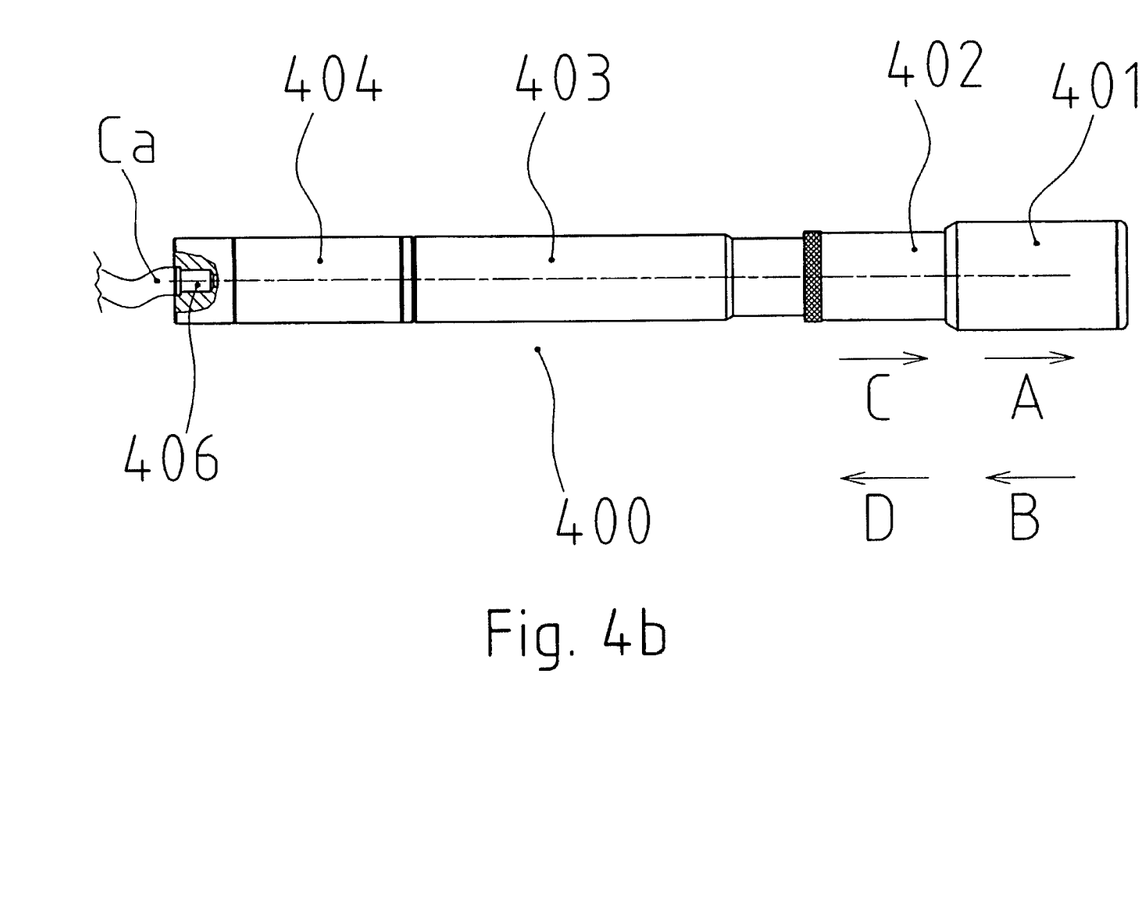

When the hydraulic pressure within the hydraulic system of the apparatus 100 and thus, as a consequence, within the hydraulic circuit of the main operating machine (for example, the operating machine 300 of FIG. 3) increases, the piston 405 is translated in the sense indicated by the arrow A in FIGS. 4A and 4B. Therefore, since the piston end 405 opposite to the end connected to the hydraulic conduit Ca by means of the joint 406 is firmly fixed to the first indicating element 401, when the pressure in the main hydraulic system of the operating machine 300 increases, the first indicating element 401 will also be moved (translated) in the sense indicated by arrow A in FIGS. 4A and 4B. In particular, the displacement of the piston 405 and of the first indicating element 401 in the sense of arrow A will occur against the action (resistance) of the spring 407 which will thus be loaded. It is to be clarified that the first indicating element 401 is provided with fastening or coupling means (for example, a dent, not shown in the Figures) which engage with corresponding fastening or coupling means of the second indicating element 402 (for example, a longitudinal slot not shown in the Figures in the case that the first indicating element 401 is provided with a dent). Said coupling means allow the first indicating element 401, during its translation or motion in the sense indicated by arrow A, to "drag with it" the second indicating element 402, which will thus be translated in the sense indicated by arrow C in FIGS. 4A and 4B. Said coupling means are furthermore formed in such a way as to allow the first indicating element 401 to freely translate with respect to the second indicating element 402 during its motion in the sense indicated by arrow B. That is to say that when the first indicating element 401 is translated in the sense indicated by arrow B (due to a decrease of the hydraulic pressure in the main hydraulic system, as will be shown in the following) same first indicating element 401 will not drag with it the second indicating element 402, which conversely will still remain in the position previously taken. The function of the helical spring 407 is indeed to act upon the abutting surface 409 of the abutting ring 408, thus pushing the piston 405 and the first indicating element 401 in the sense indicated by arrow B in FIGS. 4A and 4B.

That being said, the use and utility of the indicating device 400 according to the embodiment of the present invention shown in FIGS. 4A, 4B, 5A and 5B can be thus summarized as follows.

At the beginning of a new working session (for example, milling) and thus, when the characteristics of the surface Sr to be processed are not known or, alternatively, when the processing apparatus 100 is applied to a new main operating machine 300 (and thus with a hydraulic system or with different characteristics not necessarily known to the operator O), the operator will simply proceed to translate (for example, manually) the second indicating element 402 in the sense indicated by arrow D in FIGS. 4A and 4B, thus positioning said second indicating element 402 in the position represented in FIGS. 4A and 4B, i.e. in the closest position to the end 404 of the device 400 connected to the hydraulic circuit Ca. It should be noticed that the second indicating element 402, during its motion 402 in the sense indicated by arrow D, will NOT be contrasted by any constituent part of the device 400. In particular, the second indicating element 402 will not be contrasted by the helical spring 407 during its motion 402 in the sense indicated by arrow D, since said helical spring 407 is arranged between the abutting ring 408 (fixed to the piston 405) and the other abutting ring 410 (fixed within the end 403E of the main body 403 of the device 400). It should also be noted that the second indicating element 402 is by design braked, therefore it cannot move except in conjunction with said first indicating element 401 or by the operator O "for a reset to zero" before a new recalibration. The helical spring 407, however, by acting between the two abutting rings 408 and 410 will guarantee that also the first indicating element 401 takes, with respect to the second indicating element 402, the position shown in FIGS. 4A and 4B, this being the position of maximum extension of the first indicating element 401 with respect to the second indicating element 402, or in other words, the position in which the minimum portion of the second indicating element 402 is housed within the first indicating element 401.

At the beginning of the processing or milling operations, the operator O will activate the main hydraulic system of the operating machine 300, thus causing the processing means 10 (for example, the roller of FIG. 3) to rotate until the processing means 10 achieves the desired velocity of rotation (in particular, by adjusting the hydraulic flow rate within the main hydraulic circuit by means of, for example, one or more valves suitable for that purpose). The working conditions or parameters (for example, the processing depth p) thus being defined, the operator will gradually increase the advancement velocity of the main operating machine 300, thereby also gradually increasing the stress undergone by the roller 10 and, thus, the hydraulic pressure within the main hydraulic circuit. When the pressure in the main hydraulic circuit increases, the piston 405 and, thus, the first indicating element 401 are moved (translated) in the sense indicated by arrow A in FIGS. 4A and 4B. Thus, in this manner, thanks to the reciprocal action of the coupling means with which the first indicating element 401 and the second indicator 402 are provided (for example, a mechanical dent of the first indicating element 401 which engages with a slot of the second indicating element 402), the first indicating element 401, during its translation in the sense of arrow A, will drag with it the second indicating element 402, which will thus be translated in the sense indicated by arrow C in FIGS. 4A and 4B, obviously coinciding with a sense of translation A of the first indicating element 401. A translation of the first indicating element 401 and of the second indicating element 402 in the sense indicated by arrows A and C, respectively, continues with the hydraulic pressure within the main hydraulic system progressively increasing and stops only when the maximum stress allowed for the processing roller 10 is reached. In other words, a translation of the first indicating element 401 and of the second indicating element 402 in the sense indicated by arrows A and C, stops when the maximum hydraulic pressure allowed within the hydraulic circuit is reached. At the maximum hydraulic pressure allowed, the roller 10 will halt (for example, by means of suitable safety valves included in the system or main hydraulic circuit) and the operator will be forced to stop (halt) the main operating machine 300.

Figure 5A:
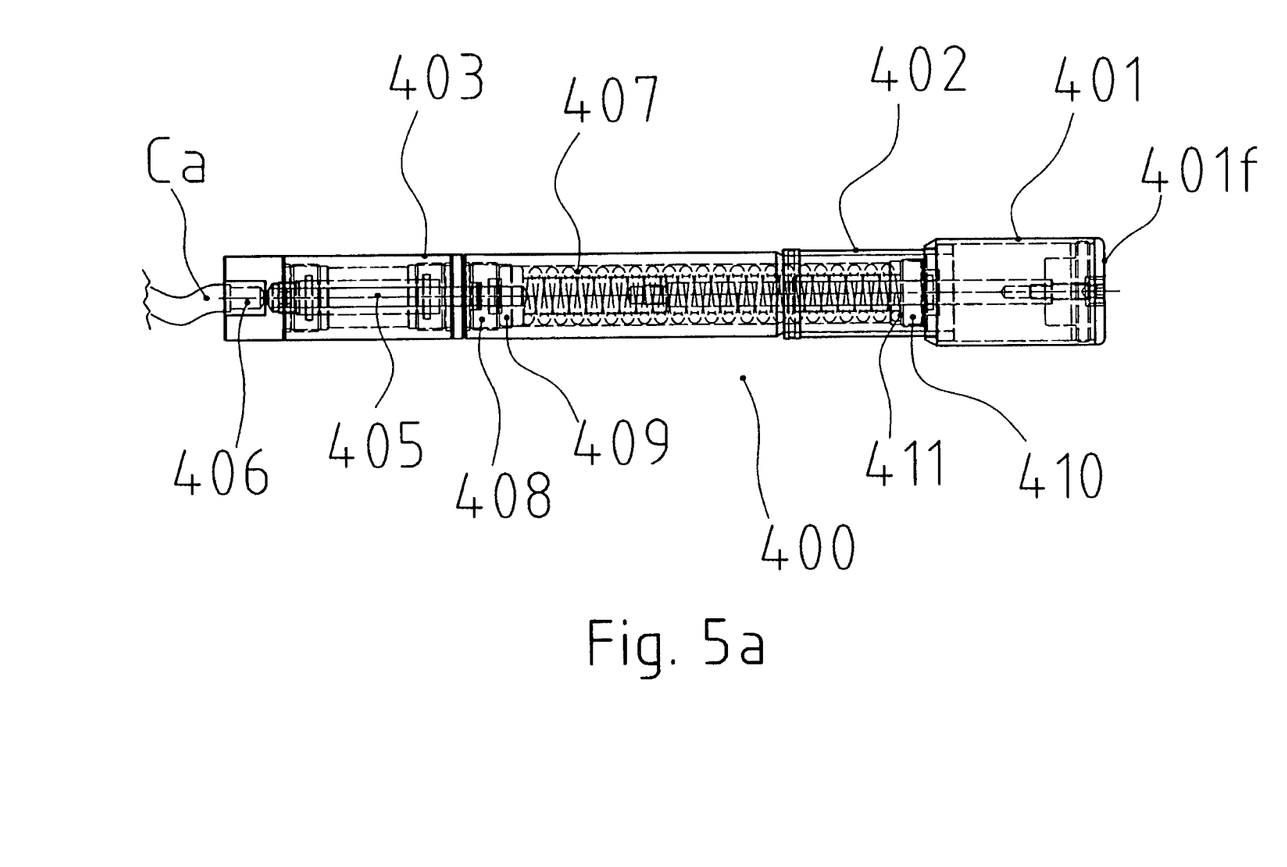
FIGS. 5A and 5B show two cross-sectional views of the device according to an embodiment of the present invention with the indicating elements in a pre-calibrating position and in the position taken after the calibration of the device has been completed, respectively.
Figure 5B:
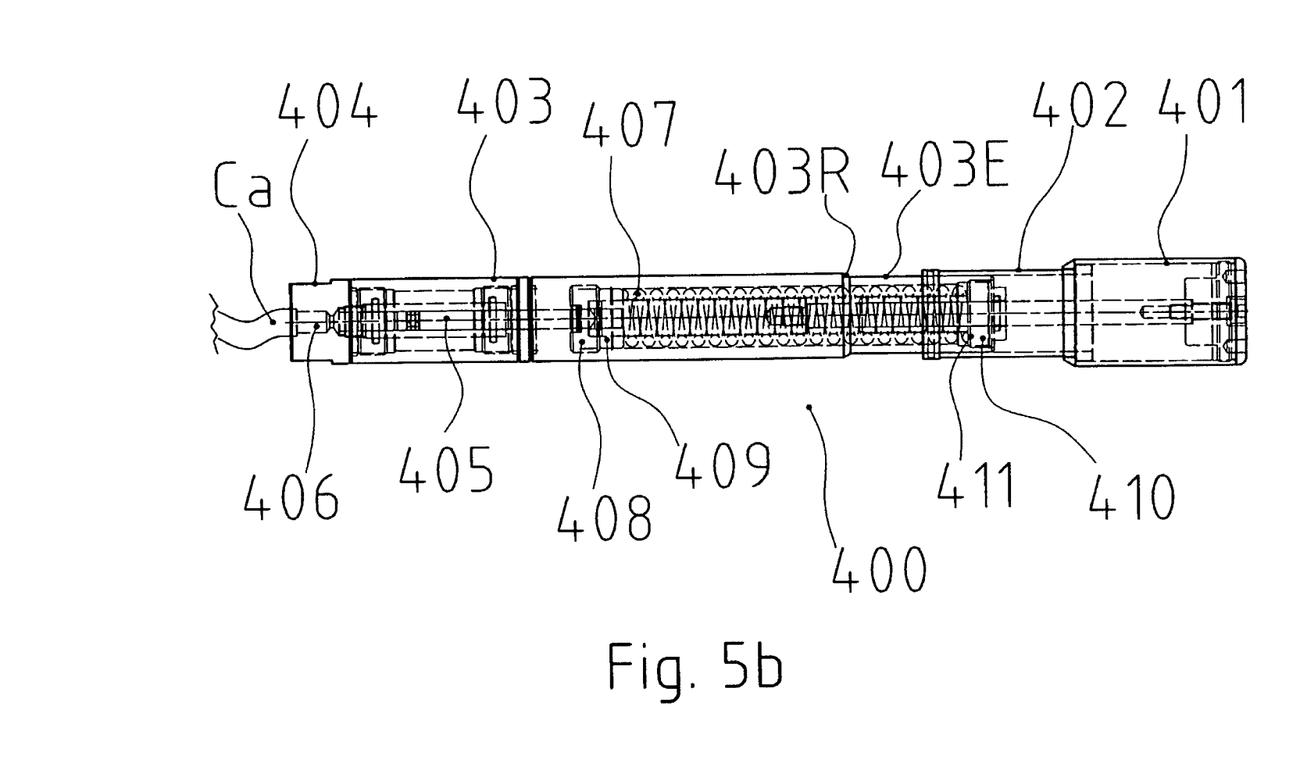

At this point, the first indicating element 401 and the second indicating element 402 will have reached the position corresponding to the maximum stress (to the maximum allowed pressure), said position being schematically represented in FIGS. 4B and 5B, which clearly show that the second indicating element 402 protrudes from the end portion 403E by a larger extent than in the starting position represented in FIGS. 4A and 4B.

The block of the roller 10 and therefore, the hydraulic pressure drop will then cause the movement of the second indicating element 402 in the sense indicated by arrow C to cease. Therefore, said second indicating element 402 will maintain the reached position with respect to the main body also during the subsequent processing (milling) operations.

In this manner, the operator O will have a clear indication of the maximum hydraulic pressure allowed within the main hydraulic circuit and thus, of the maximum stress which roller 10 may undergo.

The hydraulic pressure drop subsequent to the block of the roller 10, in particular, will cause the hydraulic push on the piston 405 to decrease or to cease. Due to the action of the helical spring 407, the piston 405 will thus be translated in the sense indicated by arrow B along with the first indicating element 401 which, in this case, will not drag with it the second indicating element 402. The second indicating element 402, as previously clarified, will instead stay in the position reached at the moment of the block of the roller 10.

At this point, the operator O, in order to optimize the processing or milling operations, in particular, in order to adequately exploit the capabilities of the main operating machine and/or of the processing apparatus, will simply have to further gradually increase the advancement velocity of the operating machine and/or the processing depth p, so that a corresponding increase of the hydraulic pressure within the main hydraulic circuit results again in a translation of the piston 405 and of the first indicating element 401 in the sense of arrow A. In particular, the operator can increase the stress until the first indicating element 401 has again reached a position, relative to the second indicating element 402, close to that represented in FIGS. 4B and 5B. After this position has been reached, the operator will be able to optimize the processing and to exploit to the maximum extent the capabilities of the operating machine 300 and/or of the roller 10 without incurring repeated blocks of the roller 10 and/or halts of the operating machine 300. In particular, the operator will be able to maintain, for example, the advancement velocity close to the maximum allowed velocity, by simply observing the position of the first indicating element 401 with respect to the second indicating element 402, and by ensuring that the position of the first indicating element 401 is maintained, with respect to the second indicating element 402, in as close as possible a position to that of FIGS. 4B and 5B.

The advantage and the usefulness of the indicating device 400 according to the present invention are thus evident.

Indeed, the same indicating device 400, besides the possibility of being newly "calibrated" each time as described above (for example, when the processing apparatus 100 and the device 400 are applied to a new or different operating machine 300, or when the same operating machine 300 and the apparatus are used in different conditions and places or for processing different surfaces), offers the operator the possibility of detecting, during the same processing stage (for example, during the milling of a stretch of surface) the variations of the characteristics of the surface and, thus, of appropriately adjusting the operating parameters of the machine and/or of the roller. For example, if one assumes that the tenacity of the surface decreases along a predetermined stretch of the surface to be processed (for example, because the surface is made of different materials or because the deterioration of the surface is not uniform along the stretch to be milled and/or processed), the operator, when milling those parts or materials which are less tenacious, can increase the advancement velocity of the main operating machine 300 and/or of the processing means 10 thus consequently increasing their production and/or performance. Conversely, when processing more tenacious stretches, the operator can decrease the advancement velocity and/or the processing depth while still maximizing the performance, since he will be able to avoid halts and/or blocks of the processing means 10 while still keeping the stress close to the maximum allowed level, thus achieving homogeneous and continued processing.

It should be finally noted that the second indicating element 402 can be provided with indicating elements (not shown in the Figures), adapted to facilitate the visual perception of the first indicating element 401 with respect to the second indicating element 402 for the operator. For instance, a graduated scale, chromatic scale, a numeric scale, a bar scale etc. can be provided on the outer surface of the second indicating element 402.

Figure 6A:
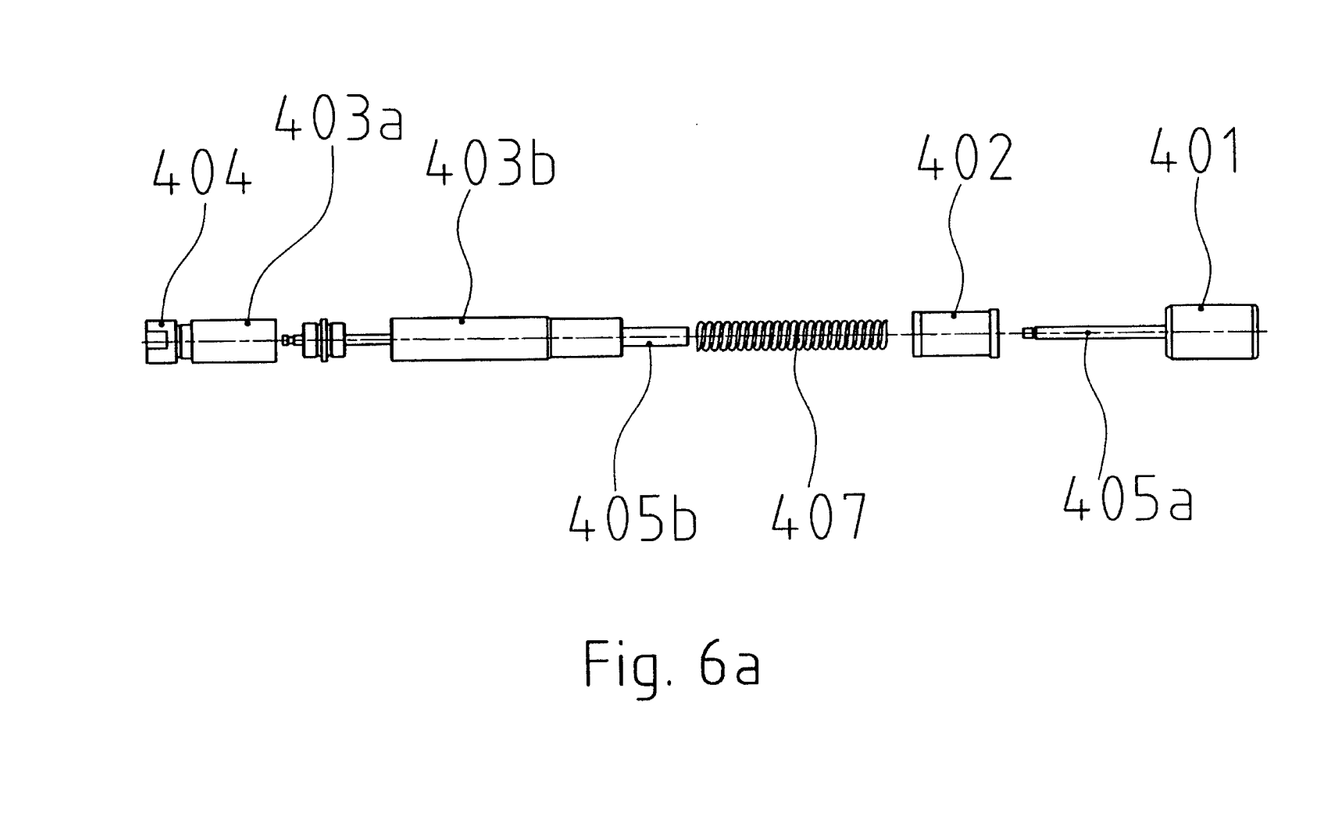
FIGS. 6A and 6B show two exploded views, side and perspective view, respectively, of the device according to the present invention.
Figure 6B:
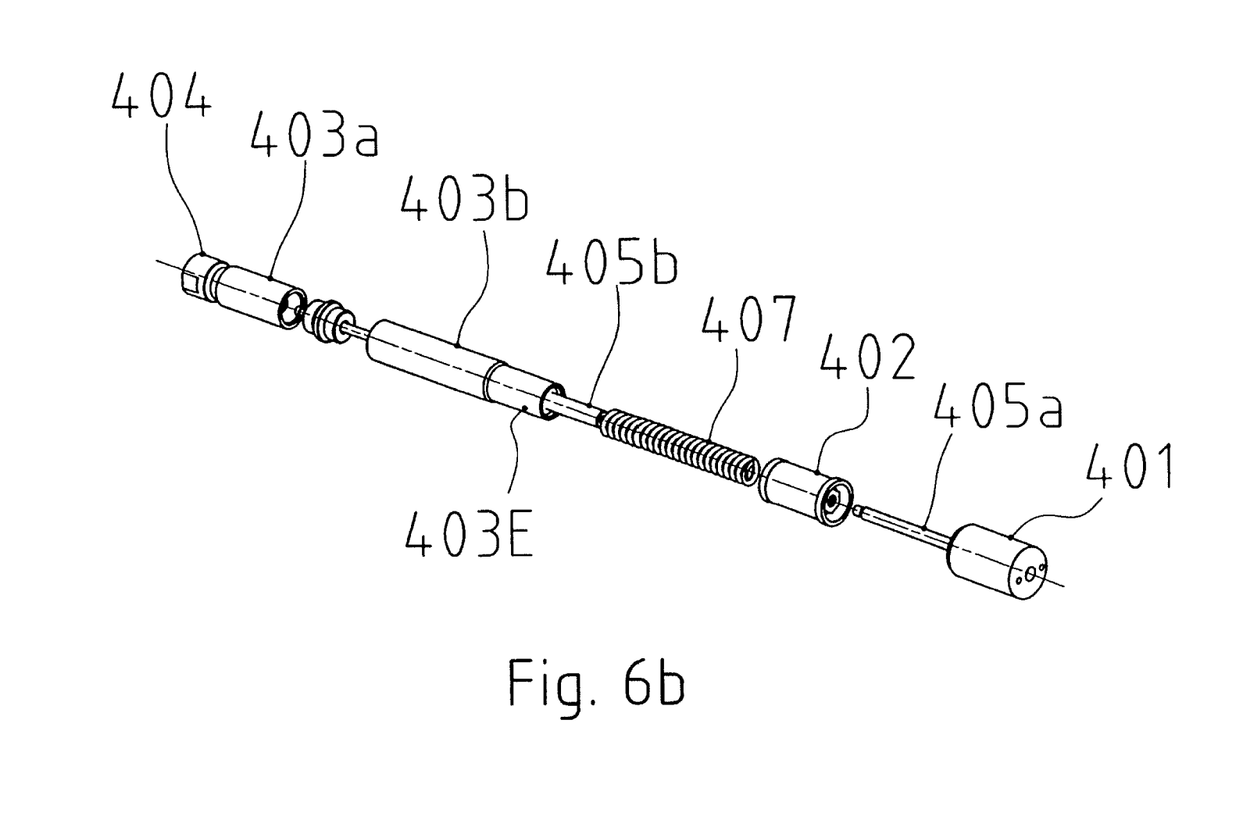

FIGS. 6A and 6B in which corresponding and/or identical constituent parts and/or characteristics of the device according to the present invention are identified by the same reference numerals, allow one to appreciate further details of the indicating device according to the present invention.

It can be inferred from FIGS. 6A and 6B that the hollow tubular main body 403 comprises, besides the end portion 403E previously described, a first intermediate sub-portion 403B rigidly connected with the end portion 403E and a second intermediate sub-portion 403A rigidly connected with the first end portion 404. The two intermediate sub-portions 403A and 403B are adapted to be fixed to one another, for example, by means of reciprocal screwing. In the same way, the piston 405 comprises two intermediate sub-portions too, in particular, a first sub-portion 405A rigidly connected to the first indicating element 401 and a second intermediate sub-portion 405B, said first and second intermediate sub-portions 405A and 405B being reciprocally connectable, for example, by means of screwing and/or engagement or positive connection. Using sub-portions, in the case of the hollow main body 403 and/or the main piston, facilitates assembling as well as maintaining the device.

It has thus been proved by means of the previous description of the embodiments of the device according to the present invention represented in the Figures, that the device allows the set goals to be achieved and/or the problems mentioned above to be solved or at least minimized.

Indeed, the device according to the present invention enables setting the processing variables of a processing apparatus (milling machine) and/or of a main operating machine (thus adapting them to the particular conditions of the moment) by means of simple and immediate operations, in such a way that same can be always exploited up to its top capabilities, regardless of the processing conditions, while avoiding repeated blocks and thus waste of time, fuel etc. In particular, the device according to the present invention is adapted to continuously and instantly signal to an operator the stress undergone by the machine (in relation to the maximum stress allowed), in such a way that the operator can continuously adjust the processing and/or use variables (in particular, the advancement velocity and/or the processing depth) of the machine and/or apparatus, thus continuously having the machine and/or apparatus undergo a stress as close as possible to the maximum allowed stress (beyond which one or more constituent parts would be damaged or blocked).

Moreover, the device according to the present invention is applicable in a simple and immediate manner by means of simple and immediate operations to machines and/or apparatuses of different types, but in particular, to machines and/or apparatuses for processing, in particular, for demolishing and/or milling roads, footpaths and/or solid surfaces in general, and further to hydraulic machines and/or apparatuses. Moreover, the device according to the present invention is a robust and reliable device, as well as being safe for the operator using it. Furthermore, the device according to the present invention is easy to assemble and to maintain and, thus, characterized by low production costs. Finally, the device according to the present invention does not require any particular technical knowledge from the operator since it is a device which calibrates itself in an automated manner and works in a comparative manner (by means of the reciprocal position of the two indicating elements), thus providing the operator with an easy indication which can be read instantly and is easy to comprehend.

Obviously, all those modifications and/or variations of the embodiments of the device described above and represented in the drawing tables which will appear clear and immediate to the skilled person, belong to the scope and the area of the present invention. For example, the device according to the present invention can comprise indicating elements which are not simply translatable but also rotatable. Analogously, the hollow main body as well as the two indicating elements can have not only a circular section but also a square section, a rectangular section, etc.

The scope and the extent of the present invention are then defined by the claims.

What is claimed is:

1. Performance indicating device adapted to be connected to a processing apparatus, in particular to an apparatus for demolishing and in particular for milling surfaces or layers upon which one can walk or drive such as for example surfaces made of asphalt or cement or of similar solid materials, and/or to a main operating machine actuating said processing apparatus, said processing apparatus comprising processing means, said device comprising:
at least a first movable indicating element adapted to be alternatively moved in a first sense of motion and in the opposite sense in case of increase and decrease of the stress undergone by said processing means, respectively, wherein
said device comprises a second indicating element, and in that
said first indicating element is connected to said second indicating element so as to drag said second indicating element during its motion in said first sense of motion, and so as to freely move with respect to said second indicating element for at least a predefined segment of its motion in the sense opposite to said first sense of motion.

2. The device according to claim 1, wherein:
said first indicating element and/or said second indicating element can be translated along a substantially straight line.

3. The device according to claim 1 wherein:
both said first and second indicating elements are movable in said first sense of motion and in the opposite sense.

4. The device according to claim 1 wherein:
said first and second indicating elements comprise first and second coupling or engagement means, respectively, and in that said first coupling or engagement means alternatively engage with and disengage from said second coupling or engagement means during the motion of said first indicating element in said first sense of motion and during the motion of said first indicating element in the sense opposite to said first sense of motion, respectively.

5. The device according to claim 1 wherein:
said second indicating element comprises indication and/or signaling means adapted to indicate and/or signal the position of said first indicating element with respect to said second indicating element.

6. The device according to claim 5, wherein:
said indication and/or signaling means are in particular adapted to signal a maximum extension position of said first indicating element with respect to said second indicating element.

7. The device according to claim 5, wherein:
said indicating and/or signaling means comprises a graduated scale.

8. The device according to claim 7, wherein:
the graduated scale comprises a chromatic scale.

9. The device according to claim 7, wherein:
the graduated scale comprises a numeric scale.

10. The device according to claim 7, wherein:
the graduated scale comprises a scale having bars.

11. The device according to claim 1 further comprising:
elastic means adapted to undergo elastic strain during the translation of said first indicating element in said first sense of motion and to move said first indicating element in the sense opposite to said first sense of motion in case said strain decreases.

12. The device according to claim 11, wherein:
said elastic means comprise a helical spring.

13. The device according to claim 11 wherein:
said device comprises a translatable guiding stem or piston, in that a first end of said guiding stem or piston is fixedly connected to said first indicating element, whereas a second end is adapted to be connected to said apparatus and/or to said main operating machine, and in that said elastic means are arranged between an abutting surface defined by said guiding stem and a second abutting surface defined by said device and adapted to be placed in a fixed position with respect to said apparatus in such a way that when the stress undergone by said processing means increases, the strain applied to said elastic means increases, whereas when the stress undergone by said processing means decreases, the strain applied to said elastic means decreases and said stem or piston is translated in said translation sense opposite to said first translation sense by the action of said elastic means.

14. The device according to claim 1 wherein:
the device is connected to a hydraulic circuit of the processing apparatus comprising the processing means in such a way that said first indicating element is alternatively moved in said first sense of motion and in the opposite sense in case of increase and decrease of a hydraulic pressure inside said hydraulic circuit, respectively.

15. The device according to claim 13 wherein:
said guiding stem or piston is adapted to be connected to a hydraulic conduit of said hydraulic circuit by means of a hydraulic linking joint.

16. The device according to claim 1 wherein:
said first and second indicating elements comprise a first and a second hollow tubular body, respectively, and in that at least a portion of said second hollow tubular body of said second indicating element (102) is adapted to slide inside said first hollow tubular body of said first indicating element.

17. A performance indicating device for use with a hydraulic machine comprising:
a main body coupled to a hydraulic line of the hydraulic machine, said main body having an indicator end and a hydraulic line end;
a piston placed within said main body;
a first indicator placed on the indicator end of said main body;
an intermediate sub portion connecting said piston and said first indicator together, whereby said piston and said first indicator move together longitudinally;
an abutting surface placed within said main body between said piston and said first indicator;
a spring placed between said abutting surface and said first indicator wherein said spring biases said first indicator towards said abutting surface; and
a second indicator placed on said main body adjacent to said first indicator, said second indicator coupled to said first indicator so that during motion of said first indicator in one longitudinal direction said second indicator is dragged or moves with said first indicator, and during motion of said first indicator in an opposite longitudinal direction from the one longitudinal direction said first indicator is free to translate or move freely with respect to said second indicator, whereby upon calibration said first indicator drags said second indicator to a position indicating a maximum hydraulic pressure allowed and upon a drop in hydraulic pressure the second indicator will not move providing an operator with an indication of the maximum hydraulic pressure allowed.

* * * * *